Patented May 15, 1934

1,958,837

UNITED STATES PATENT OFFICE 1,958,837

METHOD FOR CONTINUOUSLY DECORATING BRICK, TILE, ETC.

John Ramsay, Mount Savage, Md.

No Drawing. Application October 29, 1931, Serial No. 571,935

8 Claims. (Cl. 25—156)

This invention has for its object a simple, economical and efficient method of improving and decorating by veneering, coating, slipping or glazing, brick, tile or other articles made from clay, shale or other suitable material, whereby the brick, tile or other articles are given an entirely different and improved appearance, and are rendered much less absorbent or more impervious on the surface to be exposed when in use, giving a much larger usefulness and wider application in the building industry, through the addition of permanent color and texture, at a considerable reduction in cost.

The improved method according to this invention relates to the process of manufacturing brick, tile or other articles from clay, or mixtures of clays and other materials, whereby the bricks, etc., are extruded from the orifice or final shaping die of a brick machine in the form of a plastic column or stream of clay, and essentially comprises the necessary steps to veneer said plastic column or stream of clay with a suitable veneering composition, suspended in liquid; to apply one or more coatings of veneering composition in one or more uniform layers, or in one or more uniform layers superimposed in one or more coats in spots or splashes, said layers or spots or splashes to be of the same or different colors, shades or tints of colors to form a smooth or uneven surface showing various textural effects; to dry said veneering composition sufficiently to be smoothed or polished by being passed over or under rollers, or through a finishing slicker or die, and handled in the usual way after the plastic column of clay, with its coating or veneer applied as stated, is cut into brick or tile by a suitable cutting and separating mechanism.

In modern brick manufacture the plastic clay is extruded under pressure through an orifice or die having two of the dimensions of the finished brick; and the stream or column of clay continuously issuing from the die is shortly thereafter cut into the size of bricks. The modern process is very rapid, and the plastic column or stream of clay is sufficiently hard to permit cutting into proper size and handling. As one of the objects of the present invention is to provide a process of veneering, coloring, and otherwise treating the moving column of clay, which may be performed with the present apparatus for manufacturing brick, it necessarily follows that the present process, to be successful, must provide for the rapid drying of the veneer. And, as will appear hereinafter, one of the important features of the present invention consists in applying the veneer in a liquid form, yet in such combination or form that the liquid veneer will be of almost the same plasticity or water content as the column of clay, almost immediately after it is applied thereto, and which will permit of the decorated column of clay being cut into brick, in the same or approximately the same distance of travel, as is now possible with the present column of undecorated clay.

The clay or shale and other materials are mixed and beaten to plastic form in any standard brick machine; but in accordance with the present invention, the clay and other materials are heated by the use of hot water or steam during the mixing operation.

After having been heated and rendered plastic, the clay material is extruded through a die or opening in a continuous stream or column, exactly in accordance with the modern practice. In the ordinary practice, these dies or orifices are lubricated, usually with oil. In accordance with the present invention, the dies or orifices are lubricated with hot water or steam; and this hot water or steam is previously treated by the addition of any suitable and well-known coagulating reagent. Or the clay may be similarly treated before it reaches the die. Thus, when the clay column issues from the orifice it contains a coagulating reagent or is covered with a film of coagulating reagent, or both.

As the column of clay, treated as above described, issues from the orifice, it is spread, or otherwise covered, or veneered with a suitable composition suspended in a liquid. Needless to say, the present invention is in no matter limited to any particular composition, but is such as to give the desired color or shade to the issuing column; any of the well-known coloring substances being used for this purpose. However, in accordance with the present invention, the veneer is treated in two ways; first, it is heated, and second it is treated with any well-known deflocculating reagent which is disseminated throughout the composition; so that when the veneering composition comes into contact with the column of clay, the coagulant on the surface of the clay will react with the deflocculant in the veneering composition.

Air or steam may be employed for spraying the veneering composition in the issuing column of clay. If air is used to atomize the veneering composition, a coagulating reagent is added to the air, and then passed through a heat interchanger. Or if steam is the medium of atomization, then the coagulant or coagulants are added to the steam; so that when the veneering composition is atomized by the air or steam, and applied to the column of clay, the coagulant in the air or steam, as well as the coagulant in the thin film covering the issuing column of clay, coagulates the deflocculating reagent in the veneering composition as it is deposited on the heated column or stream of clay.

In accordance with the above described method, the surface of the clay column and the liquid veneering composition are of nearly the same plasticity or water content, that is, they are as near the same plasticity as possible. Accordingly, the clay column is decorated with the desired coloring and with any desired type of surfacing, without in any way reducing the rate of production, without making any change in the time required prior to the cutting operation.

When applying one thin coating of a veneering composition to the column of clay, the composition and the air used to atomize it do not have to be as hot, nor the conveyer between the brick machine and the cutting machine as long, as when a thicker coat, or two or more coats are applied. With the application of two or more coats it is desirable to increase the distance between the brick machine and the cutting machine, and this distance is also governed by the speed of the clay column, which varies with the production capacity of different machines, with the speed of the machine in operation, the plasticity or stiffness of the clay column, and also with the variable nature of the clay or shale used. As the thickness of the veneer coat or coats is increased, there is a corresponding increase in the liquid or moisture content of the veneer composition, and, when this becomes too high, and the veneer coating, when the clay column or stream has reached the cutting and separating mechanism, has not stiffened sufficiently, it is desirable to cover the veneered column with another thin film of oil or other suitable medium, through which is disseminated a suitable coagulating reagent; or the veneered column may be passed through a heated chamber, or through one enclosing a stream of hot dry air or a coagulating gas, thus drying the column by evaporation, or by coagulation and evaporation.

When it is desirable to veneer the column of clay with a smooth surface, the veneered column is passed through one or more finishing slickers or dies, of the same or nearly the same cross-section as the column of clay and the orifice or final shaping die of the brick machine, after the veneer coating has stiffened sufficiently to be smoothed down and polished by the action of these slickers or finishing dies.

If a veined or marbled effect is desired, the column of clay is veneered with two or more suitably colored veneering compositions in spots or splashes, and, while the veneering composition is still in a soft or moist condition, it is passed through a finishing slicker, which then drags and spreads the spots or splashes into streaks or veins, and these streaks or veins, when the bricks are baked or burned, show a surface similar to the veining and coloring of natural marbles.

When an effect similar to granite is desired, two or more veneer compositions of different colors or shades are applied to the column of clay in spots or splashes, and, when the veneer coating has acquired the same, or nearly the same consistency as the column of clay, it is smoothed and polished by being passed through one or more finishing rolls.

When it is desired to give an uneven textural and light-reflecting surface to the brick, tile, or other articles, this is effected by varying the pressure behind the veneering composition, or by increasing or reducing the pressure of the air or steam used to atomize or spray the veneering composition, by changing the force and/or the angle of its stream of the veneering composition as it is applied to the surface of the clay column.

The method disclosed herein is obviously subject to many changes and modifications, without departing from the spirit of the invention; and all such changes and modifications are intended to be included within the scope of the appended claims. Wherever the term brick appears in the claims, it is intended to also include tile or any other articles made of clay, shale, or similar material, which are produced from a continuous column or stream of the clay or other similar material.

What I claim as new is:

1. The method of decorating brick, which comprises extruding a column of clay material through a die, treating the clay with a coagulating reagent, and applying to the column a liquid veneer.

2. The method of decorating brick, which comprises extruding a column of clay material through a die, treating the clay with a coagulating reagent, and applying to the column a veneer including a deflocculating reagent.

3. The method of decorating brick, which comprises heating clay material and extruding a column of the heated clay material through a die, lubricating the die with hot water or steam containing a coagulating reagent, heating coloring matter and a deflocculating reagent suspended in a liquid, and applying it to the column of clay.

4. The method of decorating brick, which comprises extruding a column of clay material through a die, applying to the column a veneering composition in a liquid condition, and then applying to the column a film of a coagulating reagent.

5. The method of decorating brick, which comprises extruding a column of clay material through a die, applying to the column in spots or splashes two or more suitably colored veneering compositions, and while the veneering compositions and the clay are still soft or moist, dragging or spreading the spots or splashes into streaks or veins.

6. The method of decorating brick, which comprises extruding a column of clay material through a die, applying to the column a coagulating reagent, then applying to the column in spots or splashes two or more suitably colored veneering compositions including a deflocculating reagent and a coagulating reagent, and while the veneering compositions is still soft or moist, dragging or spreading the spots or splashes into streaks or veins.

7. The method of decorating brick, which comprises extruding a column of clay material through a die, applying to the column a coagulating reagent, then applying to the column in spots or splashes two or more veneer compositions of different colors or shades and containing a coagulating reagent and a deflocculating reagent, and thereafter polishing a veneered surface of the column.

8. The method of decorating brick, which comprises extruding a column of clay material through a die, applying to the column a coagulating reagent, then spraying the column with a veneer composition including a deflocculating reagent and a coagulating reagent, and varying the force or angle of the spray during its application.

JOHN RAMSAY.